(12) United States Patent
Sugawara et al.

(10) Patent No.: US 9,087,640 B2
(45) Date of Patent: Jul. 21, 2015

(54) CONDUCTIVE POLYMER SUSPENSION AND METHOD FOR PRODUCING THE SAME, CONDUCTIVE ORGANIC MATERIAL, AND ELECTROLYTIC CAPACITOR AND METHOD FOR PRODUCING THE SAME

(75) Inventors: Yasuhisa Sugawara, Miyagi (JP); Tomoki Nobuta, Miyagi (JP); Naoki Takahashi, Miyagi (JP); Yuji Yoshida, Miyagi (JP); Satoshi Suzuki, Miyagi (JP); Yasuhiro Tomioka, Miyagi (JP)

(73) Assignee: NEC Tokin Corporation, Miyagi (JP)

( * ) Notice: Subject to any disclaimer, the term of this patent is extended or adjusted under 35 U.S.C. 154(b) by 659 days.

(21) Appl. No.: 13/083,001

(22) Filed: Apr. 8, 2011

(65) Prior Publication Data

US 2012/0256117 A1    Oct. 11, 2012

(51) Int. Cl.
*H01B 1/00* (2006.01)
*E04B 1/74* (2006.01)
*B05D 5/12* (2006.01)
(Continued)

(52) U.S. Cl.
CPC .............. *H01G 9/028* (2013.01); *H01B 1/127* (2013.01)

(58) Field of Classification Search
USPC ................ 252/500–521.6; 528/373, 422, 423
See application file for complete search history.

(56) References Cited

U.S. PATENT DOCUMENTS 4,981,729 A * 1/1991 Zaleski .................... 427/393.5

(Continued)

FOREIGN PATENT DOCUMENTS

CN    101055803 A    10/2007
CN    101649054 A    2/2010
(Continued)

OTHER PUBLICATIONS

Office Action mailed Jan. 28, 2014 in related Japanese application No. 2011-078809 and partial English-language translation (5 pgs.).

(Continued)

*Primary Examiner* — Harold Pyon
*Assistant Examiner* — Jaison Thomas
(74) *Attorney, Agent, or Firm* — Foley & Lardner LLP (57) ABSTRACT

Provided are an electroconductive polymer suspension solution and a method for producing the same, which has excellent adhesion to a substrate and excellent liquid resistance and which can provide an organic material having high electroconductivity. An electroconductive polymer suspension solution of an exemplary embodiment of the invention contains an electroconductive polymer, at least one kind of a water-soluble polyhydric alcohol, and at least one kind of a water-soluble organic substance having two or more functional groups which can be polycondensed with the water-soluble polyhydric alcohol. The electroconductive polymer suspension solution can be produced by collecting an electroconductive polymer which is obtained by chemical oxidative polymerization of a monomer giving the electroconductive polymer by using an oxidant in a solvent containing an organic acid or a salt thereof as a dopant, by contacting the electroconductive polymer with an oxidant in an aqueous solvent containing a polyacid, and further by mixing at least one kind of a water-soluble polyhydric alcohol and at least one kind of a water-soluble organic substance having two or more functional groups which can be polycondensed with the water-soluble polyhydric alcohol.

17 Claims, 1 Drawing Sheet

(51) Int. Cl.
*H01G 9/028* (2006.01)
*H01B 1/12* (2006.01)

(56) References Cited

U.S. PATENT DOCUMENTS

| | | | | |
|---|---|---|---|---|
| 5,662,833 | A * | 9/1997 | Laakso et al. | 252/500 |
| 7,106,575 | B2 * | 9/2006 | Taketani et al. | 361/528 |
| 2004/0152832 | A1 | 8/2004 | Kirchmeyer et al. | |
| 2006/0057451 | A1 * | 3/2006 | Okuzaki et al. | 429/42 |
| 2010/0033905 | A1 * | 2/2010 | Kobayakawa et al. | 361/525 |
| 2011/0019340 | A1 * | 1/2011 | Nobuta et al. | 361/525 |
| 2011/0080691 | A1 * | 4/2011 | Ning et al. | 361/525 |
| 2014/0022704 | A1 * | 1/2014 | Petrzilek et al. | 361/525 |

FOREIGN PATENT DOCUMENTS

| | | | |
|---|---|---|---|
| JP | 7-90060 | A | 4/1995 |
| JP | 2001110683 | A | 4/2001 |
| JP | 2002-60736 | A | 2/2002 |
| JP | 2004-59666 | A | 2/2004 |
| JP | 2009-1724 | A | 1/2009 |
| JP | 201077186 | A | 4/2010 |
| JP | 2010077186 | A * | 4/2010 |
| JP | 2012-017398 | A | 1/2012 |

OTHER PUBLICATIONS

Office Action mailed May 4, 2015 in related Chinese Application No. 201110094095.4 (10 pgs.).

* cited by examiner

CONDUCTIVE POLYMER SUSPENSION AND METHOD FOR PRODUCING THE SAME, CONDUCTIVE ORGANIC MATERIAL, AND ELECTROLYTIC CAPACITOR AND METHOD FOR PRODUCING THE SAME

BACKGROUND OF THE INVENTION

1. Field of the Invention

An exemplary aspect of the invention relates to an electroconductive polymer suspension solution and a method for producing the same, an electroconductive organic material obtained from the suspension solution, and an electrolytic capacitor using it and the method for producing the same.

2. Description of the Related Art

Electroconductive organic materials are used for electrodes of capacitors, electrodes of cells such as dye-sensitized solar cells, and electrodes of electroluminescence displays. For such electroconductive organic materials, the polymer materials which are obtained by polymerizing pyrrole, thiophene, 3,4-ethylenedioxy thiophene, aniline, or the like are known, and related technologies are disclosed in JP 07-090060 A, JP 2004-059666 A and JP 2002-060736 A.

JP 07-090060 A relates to a solution (dispersion) of polythiophene and a method for producing the same, and to use of a salt to an antistatic treatment of a plastic molded article. Specifically, a dispersion of polythiophene consisting of a structural unit of 3,4-dialkoxy thiophene in the presence of a polyanion is disclosed. It is disclosed that this polythiophene dispersion is produced by oxidation polymerization of 3,4-dialkoxy thiophene at a temperature of 0 to 100° C. in a presence of a polyacid.

JP 2004-059666 A relates to a water dispersion of a complex between poly(3,4-dialkoxythiophene) and a polyanion and a method for producing the same, and to a coating composition containing the water dispersion and a coated substrate having a transparent electroconductive film formed by applying the composition. Specifically, it is disclosed that 3,4-dialkoxy thiophene is polymerized in an aqueous solvent in a presence of a polyanion using persulfuric acid as an oxidant to produce a water dispersion of a complex between poly(3,4-dialkoxythiophene) and a polyanion.

JP 2002-060736 A relates to an aqueous antistatic coating composition. Specifically, an aqueous antistatic coating composition which includes: (a) an electroconductive polymer containing a polythiophene in an cationic state that consists of a repeating structural units of 3,4-dialkoxy thiophene and polyanion, (b) a water-soluble compound having an amide bond or a hydroxyl group in the molecule that is in a liquid state at room temperature, and (c) a self-emulsion type polyester resin water dispersion is disclosed. In the aqueous antistatic coating composition, the water-soluble compound (b) is contained in the range of 40 to 6000 parts by weight with respect to 100 parts by weight of the electroconductive polymer (a), and the self-emulsion type polyester resin water dispersion (c) is formed from an aromatic carboxylic acid and a diol in which 5-sulfoisophthalic acid is contained in the range of 4 to 5 mol % in the aromatic carboxylic acid, and the self-emulsion type polyester resin water dispersion (c) is contained in the range of 20 to 5000 parts by weight in terms of solid matter with respect to 100 parts by weight of the electroconductive polymer (a).

SUMMARY OF THE INVENTION

However, by the method of conducting oxidation chemical polymerization of 3,4-dialkoxy thiophene in the presence of a polyanion which acts as a dopant, the doping ratio is difficult to be controlled, resulting in that a surplus undoped polyanion, that is a polyanion which does not contribute to electroconductivity, exists. Thus, the methods disclosed in JP 07-090060 A and JP 2004-059666 A are far from being a satisfactory method as the method for producing a polymer material having high electroconductivity.

Also, the surface resistivity of an antistatic material is generally classified to fall within a range from $10^5$ to $10^{14} \Omega/\square$, and if the electroconductivity is too high, there is a possibility of occurrence of an intense electrostatic discharge, and hence it is understood that the material does not have an electroconductivity so high as to rapidly dissipate the static charge of an charged object. Even if the material has an enough electroconductivity as an antistatic material, when it is used, for example, as an electrode of a capacitor, it is difficult to satisfy the requirement as regards low ESR from the standpoint of electroconductivity. In addition, because the water resistance of the electroconductive polymer material containing a surplus polyanion is too low, a capacitor in which the electroconductive organic material is used as an electrolyte has a drawback of poor reliability, in particular, poor properties in a high humidity atmosphere.

In the method of JP 2002-060736 A, adhesion to the substrate and the water resistance of the coated film improve by containing a self-emulsion type polyester resin water dispersion, but there is a problem that the electroconductivity of the film falls to a low level because an insulating resin is added. Also, even if it has an enough electroconductivity as an antistatic material, when it is used, for example, as an electrode of a capacitor, the electroconductivity is low and it is difficult to satisfy the requirement as regards low ESR of the capacitor. Also, there is a problem that the self-emulsion type resin tends to exist in the antistatic coating composition with maldistribution as compared with a complete dissolved type resin.

An object of an exemplary aspect of the invention is to solve the above-mentioned problems, specifically, to provide an electroconductive polymer suspension solution and a method for producing the same, which has excellent adhesion to a substrate and excellent liquid resistance and which can provide an organic material having high electroconductivity, and to provide an electrolytic capacitor having a low ESR and reliability, in particular, excellent properties in a high humidity atmosphere, and a method for producing the same.

An exemplary aspect of the invention is an electroconductive polymer suspension solution comprising: an electroconductive polymer, at least one kind of a water-soluble polyhydric alcohol, and at least one kind of a water-soluble organic substance having two or more functional groups which can be polycondensed with the water-soluble polyhydric alcohol.

An exemplary aspect of the invention is a method for producing an electroconductive polymer suspension solution, comprising: a first step of obtaining a mixture containing an electroconductive polymer by chemical oxidative polymerization of a monomer giving the electroconductive polymer by using an oxidant in a solvent containing a organic acid or a salt thereof as a dopant, a second step of collecting the electroconductive polymer from the mixture, a third step of contacting the electroconductive polymer with an oxidant in an aqueous solvent containing a polyacid, and a fourth step of mixing at least one kind of a water-soluble polyhydric alcohol and at least one kind of a water-soluble organic substance having two or more functional groups which can be polycondensed with the water-soluble polyhydric alcohol.

An exemplary aspect of the invention is an electroconductive polymer suspension solution obtained by the above-mentioned method.

An exemplary aspect of the invention is an electroconductive organic material obtained by removing the solvent by drying the above-mentioned electroconductive polymer suspension solution.

An exemplary aspect of the invention is an electrolytic capacitor comprising an electrolyte layer which contains the above-mentioned electroconductive polymer suspension solution or which contains the above-mentioned electroconductive organic material.

An exemplary aspect of the invention is a method for producing an electrolytic capacitor, comprising: forming a dielectric layer on a surface of an anode conductor consisting of a valve action metal; and forming on the dielectric layer an electrolyte layer by applying or impregnating the above-mentioned electroconductive polymer suspension solution.

An exemplary aspect of the invention can provide an electroconductive polymer suspension solution which has excellent adhesion to a substrate and excellent liquid resistance and which can provide an organic material having high electroconductivity. Also, an exemplary aspect of the invention can provide an electrolytic capacitor which has low ESR and reliability, particularly excellent properties under high humidity atmosphere.

DETAILED DESCRIPTION OF THE PREFERRED EMBODIMENT

As follows, an electroconductive polymer suspension solution and a method for producing the same, an electroconductive organic material obtained from the suspension solution, and an electrolytic capacitor using it and the method for producing the same according to an exemplary embodiment of the invention are explained in detail.
<Electroconductive Polymer Suspension Solution>

The electroconductive polymer suspension solution according to an exemplary embodiment of the invention contains an electroconductive polymer, at least one kind of a water-soluble polyhydric alcohol, and at least one kind of a water-soluble organic substance having two or more functional groups which can be polycondensed with the water-soluble polyhydric alcohol. In this electroconductive polymer suspension solution, the water-soluble polyhydric alcohol and the water-soluble organic substance completely dissolve in a solution with water-soluble polyhydric alcohol and the water-soluble organic substance, and condensation polymerization of the two can be conducted in the drying process. In the electroconductive organic material obtained by drying, a water-insoluble resin comes to exist without maldistribution, and by the effect, the electroconductive organic material having excellent adhesion to a substrate and excellent liquid resistance can be realized.

Examples of the electroconductive polymer which is contained in the electroconductive polymer suspension solution include polypyrrole, polythiophene, polyaniline and derivatives thereof. Above all, poly(3,4-ethylenedioxy thiophene) having a structural unit represented by formula (1) described below or the derivative is preferable. The electroconductive polymer may be a homopolymer or a copolymer, and may be one kind or may be two or more kinds.

(1)

The content of the electroconductive polymer in the electroconductive polymer suspension solution is preferably 0.1 to 30 parts by mass with respect to 100 parts by mass of the solvent, and is more preferably 0.5 to 20 parts by mass. The solvent of the electroconductive polymer suspension solution is preferably water.

A water-soluble polyhydric alcohol which is contained in the electroconductive polymer suspension solution is an alcohol having two or more of OH group. Also, "water-soluble" as used herein means that it completely dissolves in a solution which contains water as a main solvent. The water-soluble polyhydric alcohol may be one kind or may be two or more kinds.

As the water-soluble polyhydric alcohol, preferable are ethylene glycol, butylene glycol, propylene glycol, 3-methyl-1,3-butanediol, hexylene glycol, diethylene glycol, dipropylene glycol, glycerin, diglycerin, inositol, xylose, glucose, mannitol, trehalose, erythritol, xylitol, sorbitol, pentaerythritol, polyethylene glycols, polypropylene glycols, and polyvinyl alcohols, and more preferable is erythritol or pentaerythritol. Erythritol or pentaerythritol interacts with an undoped polyacid ion (resistive component) which is located in the vicinity of the electroconductive polymer particles in the electroconductive polymer suspension solution, to reduces the resistance between the electroconductive polymer particles and at the same time to increase the density of the electroconductive polymer, and hence to enable to make the electroconductivity higher.

Also, it is preferable that the water-soluble polyhydric alcohol has a valence of 3 or higher. The resin formed by condensation polymerization reaction of a water-soluble polyhydric alcohol having a valence of 3 or higher with a water-soluble organic substance having two or more functional groups which can be polycondensed with it has a cross-linked structure and hence has lower liquid absorbability and excellent liquid resistance than a resin having a linear structure. From the standpoint, erythritol or pentaerythritol is more preferable.

Erythritol has a higher crystallinity than sorbitol, maltose or the like and accordingly has low hygroscopicity, and hence is easy to be handled. Erythritol is also known as a food additive used as a sweetener, and is excellent in safety and stability. Further, erythritol is several-fold higher in solubility in water than ethylene glycol, glycerin or the like, and hence provides an advantage that there is a lot of flexibility in designing the addition amount thereof.

Pentaerythritol is characterized by being slowly sublimed when heated, and by undergoing dehydration and polymerization when heated at a temperature equal to or higher than the melting point thereof. Thereby, pentaerythritol has an advantage that the properties of the organic material are changed to improve the density and the strength thereof. Such reaction originates from the chemical structure thereof, and hardly results from the chemical structure such as that of erythritol or sorbitol.

If the content of the water-soluble polyhydric alcohol in the electroconductive polymer suspension solution is 100 parts by mass or more with respect to 100 parts by mass of the electroconductive polymer, more preferably 200 parts by mass or more, the higher advantageous effect can be realized. Note that, upper limit of the content of the water-soluble polyhydric alcohol is not particularly limited as long as the alcohol that can be dissolved in the solvent, but is preferably 3000 parts by mass or less.

A water-soluble organic substance which is contained in the electroconductive polymer suspension solution is a water-soluble organic substance except for the water-soluble polyhydric alcohols and has two or more functional groups which can be polycondensed with the water-soluble polyhydric alcohol. As the functional group, epoxy group, hydroxyl group, or carboxyl group is preferable, however, carboxyl group is particularly more preferable from the standpoints of stability in the electroconductive polymer suspension solution and of reactivity with the water-soluble polyhydric alcohol. Also, "water-soluble" as used herein means that it completely dissolves in a solution which contains water as a main solvent. The water-soluble organic substance may be one kind or may be two or more kinds.

Examples of the water-soluble organic substance having two or more epoxy groups include sorbitol polyglycidyl ethers, polyglycerol polyglycidyl ethers, diglycerol polyglycidyl ethers, glycerol polyglycidyl ethers, trimethylolpropane polyglycidyl ethers, and polypropylene glycol diglycidyl ethers. Note that, "the polyglycidyl ether" means that at least two H in OH groups are substituted with a glycidyl group, and the upper number limit of H substituted by the glycidyl group is the number of OH groups of the compound before substitution. The condensation polymerization of the water-soluble polyhydric alcohol and the water-soluble organic substance having two or more epoxy groups results in a polyether resin.

Examples of the water-soluble organic substance having two or more carboxyl groups include oxalic acid, acetylenedicarboxylic acid, malonic acid, succinic acid, fumaric acid, malic acid, oxalacetic acid, glutaric acid, oxoglutaric acid, adipic acid, citric acid, oxalosuccinic acid, ortho-phthalic acid, hemimellitic acid, trimesic acid, mellophanic acid, benzene pentacarboxylic acid, and mellitic acid. From the standpoints of stability in the aqueous solution and of reactivity with the water-soluble polyhydric alcohol, ortho-phthalic acid is preferable. The condensation polymerization of the water-soluble polyhydric alcohol and the water-soluble organic substance having two or more carboxyl groups results in a polyester resin.

The content of the water-soluble organic substance in the electroconductive polymer suspension solution is preferably 1 to 200 parts by mass with respect to 100 parts by mass of the electroconductive polymer. More preferably, 50 to 100 parts by mass of the water-soluble organic substance is contained.

It is preferable that the electroconductive polymer suspension solution further contains a polyacid. Examples of the polyacid include: polycarboxylic acids such as polyacrylic acids, polymethacrylic acids, polymaleic acids; polysulfonic acids such as polyvinyl sulfonic acids, polystyrene sulfonic acids, and copolymers having a structural unit thereof. Above all, polystyrene sulfonic acids having a structural unit represented by formula (2) described below are preferable. The polyacid may be one kind or may be two or more kinds.

(2)

The weight average molecular weight of the polyacid is preferably 2,000 to 500,000, and is more preferably 10,000 to 200,000.

The content of the polyacid in the electroconductive polymer suspension solution is preferably 20 to 3,000 parts by mass with respect to 100 parts by mass of the electroconductive polymer, and is more preferably 30 to 1,000 parts by mass.

It is preferable that the electroconductive polymer suspension solution further contains at least one kind of organic polymer resin. The resin having many mixed branches of cross-linked structure and linear structure can be obtained by containing the water-insoluble resin, which is obtained by condensation polymerization reaction of a water-soluble polyhydric alcohol and a water-soluble organic substance that are both dissolved in the solution in the drying process, and the organic polymer resin. Therefore, the electroconductive organic material which further improved adhesion to the substrate and liquid resistance is obtained. Also, since the organic polymer resin is contained, the electroconductive organic material having liquid resistance is obtained even before the condensation reaction of the water-soluble polyhydric alcohol and the water-soluble organic substance or even before finishing the condensation reaction.

The organic polymer resin is an organic polymer resin except for the electroconductive polymer, but preferably contains a phthalate ester. Examples of the organic polymer resin include polystyrenes, polyethylenes, polypropylenes, polyvinyl chlorides, polyvinylidene chlorides, polyvinyl acetates, polyvinyl alcohols, polymethyl methacrylates, polyamides, polyimides, polyamide-imides, polyesters, polyethers, polyethylene terephthalates, polyethylene glycol phthalates, polycarbonates, polyphenylene oxides, polyurethane, polyacetals, diallyphthalates, polyacrylates, polymethacrylates, polyacrylonitriles, polytetrafluoroethylenes, polybutadienes, polyisoprenes, polysiloxanes, polycarbonate, cellulose, methyl cellulose, ethyl cellulose, fluorine resins, urea resins, silicon resins, phenol resins, melamine resins, epoxy resins, acryl resins, alkyd resins, butyral resins, silicone resins, the polylactic acids, and compounds having a phthalate ester structure such as polydiethylene glycol phthalate diols. Particularly, the organic polymer resin is preferably a chemical compound represented by formula (3) described below. In formula (3) described below, n is 2 or more, preferably 10 or more, and is more preferably 50 or more.

(3)

$$\text{HO} \left[ \phantom{X} \text{O} \phantom{X} \right] \text{O} - \underset{\text{(phthalate)}}{\text{C(=O)-C}_6\text{H}_4\text{-C(=O)}} - \text{O} \left[ \phantom{X} \text{O} \phantom{X} \right]_n \text{OH}$$

The mixed amount of the organic polymer resin is preferably in the range of 0.1 to 10 parts by mass with respect to 100 parts by mass of the electroconductive polymer in the electroconductive polymer suspension solution, and is more preferably in the range of 0.1 to 3 parts by mass.

<Method for Producing Electroconductive Polymer Suspension Solution>

A method for producing an electroconductive polymer suspension solution according to an exemplary embodiment of the invention has the following steps.

(First Step)

In an exemplary embodiment of the invention, chemical oxidative polymerization of a monomer giving an electroconductive polymer by using an oxidant in a solvent containing an organic acid or a salt thereof as a dopant is conducted to obtain a mixture containing the electroconductive polymer. In the first step, an electroconductive polymer having high degree of polymerization and high crystallinity can be obtained.

Examples of the dopant include alkyl sulfonic acids, benzenesulfonic acids, naphthalenesulfonic acids, anthraquinone sulfonic acids, camphor sulfonic acid and the derivatives of these, and the salts of them such as irons(III). The sulfonic acid may be a monosulfonic acid, may be a disulfonic acid, and may be a trisulfonic acid. Examples of the derivative of alkyl sulfonic acid include 2-acrylamide-2-methylpropanesulfonic acid. Examples of the derivative of benzenesulfonic acid include phenolsulfonic acid, styrenesulfonic acid, toluenesulfonic acid, and dodecyl benzene sulfonic acid. Examples of the derivative of naphthalenesulfonic acid include 1-naphthalenesulfonic acid, 2-naphthalenesulfonic acid, 1,3-naphthalenedisulfonic acid, 1,3,6-naphthalenetrisulfonic acid, and 6-ethyl-1-naphthalenesulfonic acid. Examples of the derivative of anthraquinone sulfonic acid include anthraquinone-1-sulfonic acid, anthraquinone-2-sulfonic acid, anthraquinone-2,6-disulfonic acid, and 2-methylanthraquinone-6-sulfonic acid. Above all, 1-naphthalenesulfonic acid, 2-naphthalenesulfonic acid, 1,3,6-naphthalenetrisulfonic acid, anthraquinone disulfonic acid, p-toluenesulfonic acid, camphor sulfonic acid or an iron(III) salt thereof is preferable. Due to significant influence on high crystallization of the polymerized substance, camphor sulfonic acid is more preferable. Camphor sulfonic acid may be an optically active substance. The Dopant may be one kind or may be two or more kinds.

The amount of the dopant used is not particularly limited because it can be removed in the second step even when the dopant is excessive, however, is preferably 1 to 100 parts by mass with respect to 1 part by mass of the monomer, and is more preferably 1 to 50 parts by mass.

The solvent may be water, an organic solvent or a water-mixed organic solvent. A solvent having satisfactory compatibility with the monomer is preferably selected, and a solvent having satisfactory compatibility with the dopant and the oxidant is particularly preferably selected. Examples of the organic solvent include alcohol type solvents such as methanol, ethanol and propanol, and low polarity solvents such as acetonitrile and acetone. The organic solvent may be one kind or may be two or more kinds. Above all, ethanol or a mixed solvent of ethanol with water is preferable.

The monomer giving an electroconductive polymer may be selected depending on the electroconductive polymer to be directed to, however, is preferably a monomer selected from the group consisting of pyrrole, thiophene, aniline and derivatives thereof. The monomer may be one kind or may be two or more kinds.

Polypyrrole and the derivative thereof are obtained by polymerizing a corresponding pyrrole or the derivative thereof. Examples of the pyrrole derivative include 3-alkylpyrroles such as 3-hexylpyrrole, 3,4-dialkylpyrroles such as 3,4-dihexylpyrrole, 3-alkoxypyrroles such as 3-methoxypyrrole, and 3,4-dialkoxypyrroles such as 3,4-dimethoxypyrrole.

Polythiophene and the derivative thereof are obtained by polymerizing a corresponding thiophene or the derivative thereof. Examples of the thiophene derivative include 3,4-ethylenedioxythiophene and the derivative thereof, 3-alkylthiophene such as 3-hexyl thiophene, and 3-alkoxythiophene such as 3-methoxythiophene. Examples of the 3,4-ethylenedioxythiophene derivative include 3,4-(1-alkyl)ethylenedioxythiophenes such as 3,4-(1-hexyl)ethylenedioxythiophene.

Polyaniline and the derivative thereof are obtained by polymerizing a corresponding aniline or the derivative thereof. Examples of the aniline derivative include 2-alkylaniline such as 2-methylaniline, and 2-alkoxyaniline such as 2-methoxyaniline.

Above all, 3,4-ethylenedioxy thiophene represented by formula (4) described below or the derivative is preferable as the monomer.

(4)

The concentration of the monomer in the solvent is preferably 0.1 to 50% by mass, and is more preferably 0.5 to 30% by mass.

The oxidant is not particularly limited. Examples of the usable oxidant include iron(III) salts of inorganic acids such as iron(III) chloride hexahydrate, anhydrous iron(III) chloride, iron(III) nitrate nonahydrate, anhydrous ferric nitrate, iron(III) sulfate n-hydrate (n=3 to 12), ammonium iron(III) sulfate dodecahydrate, iron(III) perchlorate n-hydrate (n=1, 6) and iron(III) tetrafluoroborate; copper(II) salts of inorganic acids such as copper(II) chloride, copper(II) sulfate and copper(II) tetrafluoroborate; nitrosonium tetrafluoroborate; persulfates such as ammonium persulfate, sodium persulfate and potassium persulfate; periodates such as potassium periodate; hydrogen peroxide, ozone, potassium hexacyanoferrate(III), tetraammonium cerium(IV) sulfate dihydrate, bromine and iodine; and iron(III) salts of organic acids such as iron(III) p-toluenesulfonate. Above all, iron(III) salts of the inorganic acid or the organic acid and persulfates are preferable, ammonium persulfate or iron(III) p-toluenesulfonate is more preferable. Iron(III) p-toluenesulfonate is still more preferable because it also functions as a dopant. The oxidant may be used each alone or in combinations of two or more thereof.

The amount of the oxidant used is not particularly limited because the oxidant can be removed in the second step even when the oxidant is excessive, however, is preferably 0.5 to 100 parts by mass with respect to 1 part by mass of the monomer, and is more preferably 1 to 50 parts by mass for the purpose of obtaining a polymer having a high conductivity by performing the reaction in a milder oxidative atmosphere.

The reaction temperature of the chemical oxidative polymerization is not particularly limited, but is generally in the vicinity of the reflux temperature of the solvent used, and is preferably 0 to 100° C., more preferably 10 to 50° C. When the reaction temperature is inappropriate, the electroconductivity may be degraded. The reaction time of the chemical oxidative polymerization depends on the kind and the amount of the oxidant, the reaction temperature, the stirring conditions, and the like, but is preferably about 5 to 100 hours.

The first step is preferably conducted in the presence of a substance having surface-activating. For the substance having surface-activating, anionic surfactants, cationic surfactants, amphoteric surfactants can be used, and dodecylbenzenesulfonic acid or polyethylene glycol is preferable.

(Second Step)

In an exemplary embodiment of the invention, the electroconductive polymer is collected from the mixture obtained by the first step. Specifically, from the reaction solution containing the electroconductive polymer obtained by chemical oxidative polymerization, the electroconductive polymer is separated and washed to remove the dopant, the unreacted monomer, residual metal ions derived from the oxidant and anions. In the second step, it is possible to sufficiently conduct purification treatment to obtain the electroconductive polymer having a high purity.

Examples of the method for separating the electroconductive polymer from the reaction solution include filtration method and centrifugal separation method.

As for the washing solvent, it is preferable to use the solvent which can dissolve the monomer and/or the oxidant without dissolving the electroconductive polymer. Examples of the washing solvent include water and alcohol type solvents such as methanol, ethanol, and propanol. The washing solvent may be one kind or may be two or more kinds. The extent of the washing can be checked by pH measurement or colorimetric observation of the washing solvent after washing.

Further, it is preferable to wash the electroconductive polymer with hot water and/or to heat-treat the electroconductive polymer because the metal component derived from the oxidant can be removed to a higher extent. The temperature for the heat treatment is not particularly limited as long as it is equal to or lower than the decomposition temperature of the electroconductive polymer, however the heat treatment is preferably conducted at a temperature lower than 300° C. An ion exchange treatment using an ion exchange resin is also effective as a method for removing the metal ion and anions derived from the oxidant.

The impurities contained in the electroconductive polymer can be quantitatively determined by ICP emission analysis, ion chromatography, or the like.

(Third Step)

In an exemplary embodiment of the invention, in an aqueous solvent containing a polyacid, the electroconductive polymer collected in the second step is contacted with an oxidant. In the third step, the electroconductive polymer is contacted with the polyacid as a dispersing agent as well as an oxidant to obtain an electroconductive polymer suspension solution in which an electroconductive polymer is sufficiently dispersed. The dispersion mechanism appears to include at least doping effect of a polyanion derived from the polyacid.

For the polyacid, the above-mentioned polyacid can be used. Above all, polystyrene sulfonic acid is preferable. The weight average molecular weight of the polyacid is preferably 2,000 to 500,000, and is more preferably 10,000 to 200,000.

The amount of the polyacid used is preferably 20 to 3,000 parts by mass with respect to 100 parts by mass of the electroconductive polymer obtained by the second step, and is more preferably 30 to 1,000 parts by mass.

For the oxidant, the same oxidant which is used in the first step can be used. Above all, ammonium persulfate or hydrogen peroxide is preferable.

The amount of the oxidant used is preferably 10 to 500 parts by mass with respect to 100 parts by mass of the electroconductive polymer obtained by the second step, and is more preferably 50 to 300 parts by mass.

For the aqueous solvent, water is preferable, but it does not have any problem at all even if a water-soluble organic solvent is added.

The reaction temperature in the third step is not particularly limited, but is preferably 0 to 100° C., and is more preferably 10 to 50° C. The reaction time is not particularly is about 5 to 100 hours. Also, after the third step, it is preferable to conduct above-mentioned ion-exchange treatment.

(Fourth Step)

In an exemplary embodiment of the invention, during or after the third step, at least one kind of a water-soluble polyhydric alcohol and at least one kind of a water-soluble organic substance having two or more functional groups which can be polycondensed with the water-soluble polyhydric alcohol are mixed. Condensation polymerization of the water-soluble polyhydric alcohol and the water-soluble organic substance which are added in the fourth step is conducted in the drying process to make a water-insoluble resin exist in an electroconductive organic material without maldistribution, and by the effect, the electroconductive organic material having excellent adhesion to a substrate and excellent liquid resistance can be realized.

For the water-soluble polyhydric alcohol, the above-mentioned alcohol can be used. Particularly, electroconductivity improves by mixing erythritol or pentaerythritol as the water-soluble polyhydric alcohol. More specifically, erythritol or pentaerythritol interacts with an undoped dopant anion (resistance component) served in the third step, which is located in the vicinity of the electroconductive polymer particle in the electroconductive polymer suspension solution, to make the resistance between the electroconductive polymer particles lower and to make the density of the electroconductive polymer higher, and further high electroconductivity can be realized.

Even more particularly, the water-soluble polyhydric alcohol having a valence of 3 or higher is used to obtain a resin which has a cross-linked structure by condensation polymerization reaction with the water-soluble organic substance and hence lower liquid absorbability and excellent liquid resistance can be realized. From the standpoint, erythritol or pentaerythritol is preferable.

If the mixing amount of the water-soluble polyhydric alcohol is 100 parts by mass or more with respect to 100 parts by mass of the electroconductive polymer, more preferably 200 parts by mass or more, the higher advantageous effect can be realized. Note that, upper limit of the content of the water-soluble polyhydric alcohol is not particularly limited as long as the alcohol that can be dissolved in water as a solvent, but is preferably 3,000 parts by mass or less.

For the water-soluble organic substance, the above-mentioned substance can be used, but water-soluble organic substances having two or more carboxyl groups are preferable. Particularly, by mixing ortho-phthalic acid as the water-soluble organic substance and by condensation polymerization with the water-soluble polyhydric alcohol in the drying process, a resin can be formed in the electroconductive organic material without maldistribution, and the electroconductive organic material having excellent adhesion to a substrate and excellent liquid resistance can be obtained.

The mixing amount of the water-soluble organic substance is preferably 1 to 200 parts by mass with respect to 100 parts by mass of the electroconductive polymer, and is more preferably 50 to 100 parts by mass.

<Electroconductive Organic Material>

An electroconductive organic material according to an exemplary embodiment of the invention is obtained by drying the above-mentioned electroconductive polymer suspension solution to remove the solvent, and it has excellent adhesion to a substrate and excellent liquid resistance as well as high electroconductivity. The drying temperature for removing the solvent is not particularly limited as long as the temperature is the decomposition temperature of the electroconductive polymer or less, but is preferably 300° C. or less.

Before drying the electroconductive polymer suspension solution, condensation polymerization of the water-soluble polyhydric alcohol which is contained in the electroconductive polymer suspension solution and the water-soluble organic substance which is contained in the electroconductive polymer suspension solution is preferably conducted at a temperature of 70 to 105° C. The temperature is more preferably 80 to 100° C. In the electroconductive organic material obtained by drying, a water-insoluble resin obtained by the condensation polymerization reaction comes to exist without maldistribution, and by the effect, the electroconductive organic material having excellent adhesion to a substrate and excellent liquid resistance can be realized.

<Electrolytic Capacitor and the Method of Producing the Same>

The electrolytic capacitor according to an exemplary embodiment of the invention has a polymer electrolyte layer which includes the above-mentioned electroconductive polymer suspension solution or the above-mentioned electroconductive organic material. It is preferable that the polymer electrolyte layer is in a solid state. In an electrolytic capacitor according to an exemplary embodiment of the invention, the material by which the polymer electrolyte is formed has a high electroconductivity and thereby an electrolytic capacitor having a low ESR can be obtained. Even more particularly, high crystalline polymer materials relatively have high oxygen barrier property and also have excellent adhesion to a substrate and excellent liquid resistance by the advantageous effect of the cross-linked structure resin. Therefore, it is expected to improve the reliability of the electrolytic capacitor.

Figure 2:
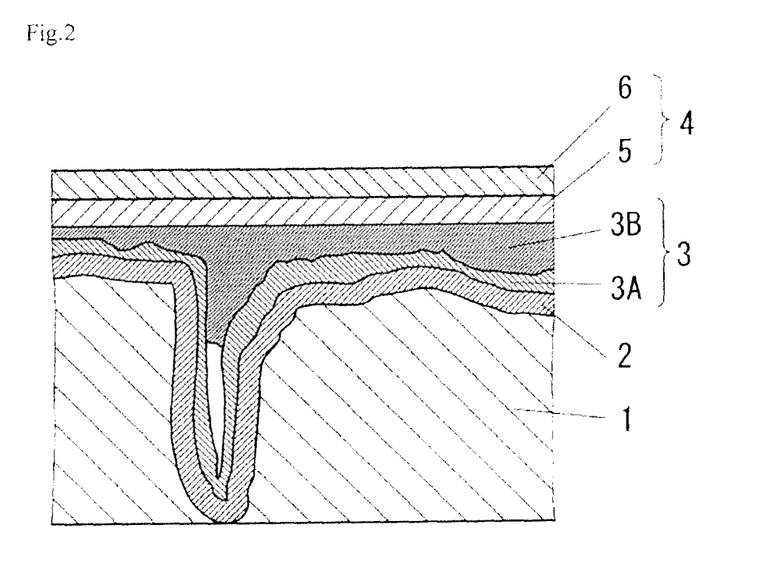
FIG. 2 is a schematic sectional view showing a structure of a solid electrolytic capacitor according to an exemplary embodiment of the invention.

FIG. 2 shows a schematic sectional view illustrating the structure of a solid electrolytic capacitor according to an exemplary embodiment of the invention. The solid electrolytic capacitor has a structure in which dielectric layer 2, solid electrolyte layer 3 and cathode conductor 4 are formed in this order on anode conductor 1.

Anode conductor 1 is formed of: a plate, a foil or a wire of a valve action metal; a sintered body made of fine particles of a valve action metal; or a porous metal subjected to a surface area enlargement treatment by etching. Examples of the valve action metal include tantalum, aluminum, titanium, niobium and zirconium, and alloys of these. Among these, at least one valve action metal selected from the group consisting of aluminum, tantalum and niobium is preferable.

Dielectric layer 2 is a layer that can be formed by the electrolytic oxidation of the surface of anode conductor 1, and is also formed in the pores of a sintered body or a porous body. The thickness of dielectric layer 2 can be appropriately adjusted by the voltage of the electrolytic oxidation.

Solid electrolyte layer 3 includes the above-mentioned electroconductive polymer suspension solution or the above-mentioned electroconductive organic material. Solid polymer electrolyte layer 3 may be a single-layered conformation or a multilayered conformation. In the solid electrolytic capacitor shown in FIG. 2, solid polymer electrolyte layer 3 consists of first electroconductive polymer compound layer 3A and second electroconductive polymer compound layer 3B. It is preferable that the first electroconductive polymer included in first electroconductive polymer compound layer 3A and the second electroconductive polymer included in second electroconductive polymer compound layer 3B are the same kind of the polymer.

Further, solid electrolyte layer 3 may also include: a electroconductive polymer obtained by polymerization of pyrrole, thiophene, aniline or a derivative of these; an oxide derivative such as manganese dioxide or ruthenium oxide; or an organic semiconductor such as TCNQ (7,7,8,8-tetracyanoquinodimethane complex salt).

Examples of the method for forming solid electrolyte layer 3 include a method by applying or impregnating the above-mentioned electroconductive polymer suspension solution on dielectric layer 2 and by removing a solvent from the electroconductive polymer suspension solution. Also, solid electrolyte layer 3 in the solid electrolytic capacitor shown in FIG. 2 can be formed by chemical oxidative polymerization or electropolymerization of a monomer giving a first electroconductive polymer to form first electroconductive polymer compound layer 3A on dielectric layer 2 and by applying or impregnating the above-mentioned electroconductive polymer suspension solution on first electroconductive polymer compound layer 3A to form second electroconductive polymer compound layer 3B.

As a monomer giving the first electroconductive polymer compound, at least one kind selected from pyrrole, thiophene, aniline and derivatives thereof can be used. As a dopant to be used for the chemical oxidative polymerization or the electropolymerization of this monomer to obtain the first electroconductive polymer compound, preferable are sulfonic acid type compounds such as benzenesulfonic acid, naphthalenesulfonic acid, phenolsulfonic acid, styrenesulfonic acid and the derivatives thereof. As for the molecular weight of the dopant, the dopant to be used can be appropriately selected from the low molecular weight compounds and high molecular weight compound. The solvent may be water only or may also be a mixture solvent including water and a water soluble organic solvent.

The application or impregnation method is not particularly limited. However, for the purpose of sufficiently filling the electroconductive polymer suspension solution in the interior of the pores of the porous material, dielectric layer 2 is preferably allowed to stand for a few minutes to a few tens of minutes after application or impregnation. A repeated immersion method, a pressure reduction method or a pressurization method is preferable.

The removal of the solvent from the electroconductive polymer suspension solution can be conducted by drying the electroconductive polymer. The drying temperature is not particularly limited as long as the drying temperature is within a temperature range in which the solvent removal is possible; however, from the viewpoint of the prevention of element degradation by heat, the upper limit of the drying temperature is preferably lower than 300° C. It is necessary to appropriately optimize the drying time according to the drying temperature; the drying time is not particularly limited as long as the drying time is within a range in which the conductivity is not impaired.

Before drying the electroconductive polymer suspension solution, condensation polymerization of the water-soluble polyhydric alcohol which is contained in the electroconductive polymer suspension solution and the water-soluble organic substance which is contained in the electroconductive polymer suspension solution may be conducted at a temperature of 70 to 105° C. The temperature is preferably 80 to 100° C. In solid electrolyte layer 3 obtained by drying, a water-insoluble resin obtained by the condensation polymerization reaction comes to exist without maldistribution, and by the effect, solid polymer electrolyte layer 3 having excellent adhesion to dielectric layer 2 and excellent liquid resistance can be realized.

Cathode conductor 4 is not particularly limited as long as cathode conductor 4 is a conductor; however, cathode conductor 4 may also be designed to have a two-layer structure formed of carbon layer 5 made of graphite or the like and of silver electroconductive resin layer 6.

EXAMPLE

As follows, an exemplary embodiment of the invention is more specifically described based on the Examples, but an exemplary embodiment of the invention is not limited too these Examples.

Example 1

First Step 3,4-ethylenedioxy thiophene (1 g) that is a monomer, camphor sulfonic acid (1 g) that is a dopant, and iron(III) para-toluenesulfonate (9 g) which functions as an oxidant and a dopant were dissolved in ethanol (30 ml) as a solvent. The obtained solution was stirred at room temperature for 24 hours to conduct oxidation polymerization. In this case, the solution turned from yellow to dark blue.

Second Step

A mixture obtained by the first step was filtered by using a reduced pressure filtration apparatus to collect a powder. The obtained powder was washed in pure water to remove the excessive oxidant and the excessive dopant. The washing with pure water was performed repeatedly until the pH of the filtrate came to be 6 to 7. After the pH of the filtrate came to be 6 to 7, the powder was further washed with ethanol to remove the monomer, the oxidant and the reacted oxidant (iron(II) para-toluenesulfonate). The washing with ethanol was performed until the color of the filtrate came to be colorless and transparent.

Third Step

The powder (0.5 g) washed in the second step was dispersed in water (50 ml) and then an aqueous solution (3.3 g) which contained 20% by weight of a polystyrene sulfonic acid (weight average molecular weight: 50,000) as a polyacid was added thereto. Ammonium persulfate (1.5 g) as an oxidant was further added to this mixture solution and it was stirred under room temperature for 24 hours.

Fourth Step

Erythritol (5 g) and ortho-phthalic acid (0.3 g) were added to the mixture obtained by the third step, and it was stirred under room temperature for 24 hours to completely dissolve erythritol and ortho-phthalic acid. The obtained polythiophene aqueous suspension solution showed dark blue.

(Evaluation of the Polythiophene Aqueous Suspension Solution)

The obtained polythiophene aqueous suspension solution was dropped onto a glass substrate in an amount of 100 μl, and the condensation polymerization reaction of erythritol and ortho-phthalic acid was conducted in a thermostatic chamber set at 90° C. After that the solvent was completely volatilized and dried in the thermostatic chamber set at 125° C. to form an electroconductive polymer film.

The surface resistance (Ω/□) and the film thickness of the obtained electroconductive polymer film were measured by four-terminal method, and the electroconductivity (S/cm) of the electroconductive polymer film was calculated. Also, liquid resistance was evaluated by immersing the obtained electroconductive polymer film in water for 10 minutes and by observing the change of the electroconductive polymer film. Note that, "◯" means a result that there is no observed change in the electroconductive polymer film, "Δ" means a result that the electroconductive polymer is partially swelled, and "X" means a result that the electroconductive polymer is fully swelled. The above-mentioned results are shown in Table 1.

Figure 1:
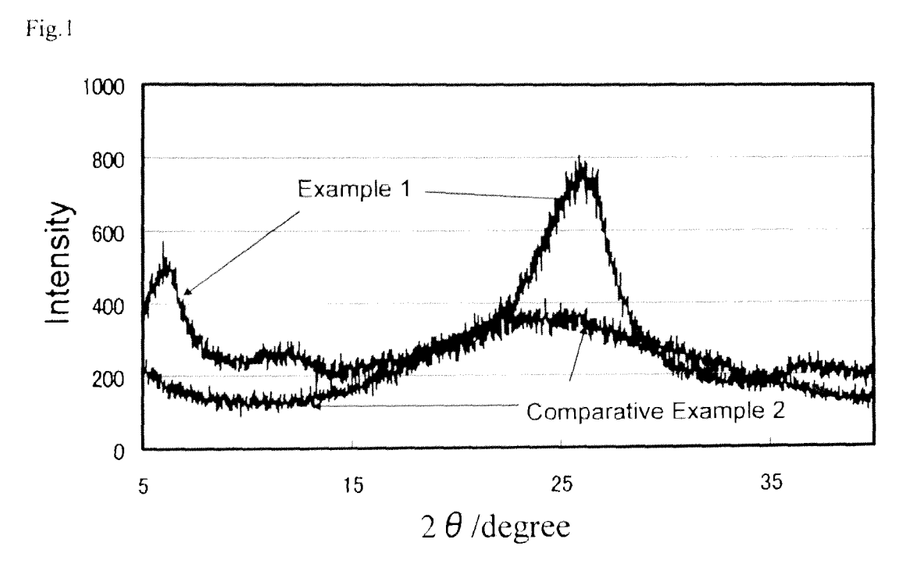
FIG. 1 is a chart showing X-ray diffractions of electroconductive polymer films obtained in Example 1 and Comparative Example 2.

Further, the crystallinity of the electroconductive polymer film was evaluated by X-ray diffraction method. The measurement was conducted by scanning 2θ in the range from 5° to 40°. The measurement result of X-ray diffraction is shown in FIG. 1.

Example 2

A polythiophene aqueous suspension solution was produced in the same manner as in Example 1 except that a polystyrene sulfonic acid having a weight average molecular weight of 14,000 was used as a polyacid in the third step. Further, in the same manner as in Example 1 except that the obtained polythiophene aqueous suspension solution was used, an electroconductive polymer film was formed and electroconductivity and liquid resistance of the electroconductive polymer film was evaluated. The results are shown in Table 1.

Example 3

A polythiophene aqueous suspension solution was produced in the same manner as in Example 1 except that, in the second step, washing with boiling heat pure water was conducted, following washing with pure water and washing with the ethanol. Further, in the same manner as in Example 1 except that the obtained polythiophene aqueous suspension solution was used, an electroconductive polymer film was formed and electroconductivity and liquid resistance of the electroconductive polymer film was evaluated. The results are shown in Table 1.

Example 4

A polythiophene aqueous suspension solution was produced in the same manner as in Example 1 except that, in the second step, heat drying in a thermostatic chamber set at 125° C. was conducted, following washing with pure water and washing with the ethanol. Further, in the same manner as in Example 1 except that the obtained polythiophene aqueous suspension solution was used, an electroconductive polymer film was formed and electroconductivity and liquid resistance of the electroconductive polymer film was evaluated. The results are shown in Table 1.

Example 5

First Step 3,4-ethylenedioxy thiophene (1 g) that is a monomer was dispersed in 100 ml of water as a solvent using dodecyl benzene sulfonic acid (2.3 g) which functions as a dopant and a surfactant. The obtained dispersion was stirred under room temperature for 1 hour to be fully dispersed, and then ammonium persulfate (2.4 g) as an oxidant was added to this dispersion. The obtained dispersion was stirred at room temperature for 100 hours to conduct oxidation polymerization. In this case, the solution turned from yellow to dark blue.

Second Step

From the mixture obtained by the first step, a powder was collected by using a centrifugal separator (5,000 rpm). The obtained powder was washed by decantation in the centrifugal separator by using pure water to remove the excessive oxidant and the excessive dopant. The washing with pure water was performed repeatedly until the pH of the supernatant liquid came to be 6 to 7.

The steps of and after the third step were conducted in the same manner as in Example 1. Further, in the same manner as in Example 1 except that the obtained polythiophene aqueous suspension solution was used, an electroconductive polymer film was formed and electroconductivity and liquid resistance of the electroconductive polymer film was evaluated. The results are shown in Table 1.

Example 6

First Step 3,4-ethylenedioxy thiophene (1 g) that is a monomer and camphor sulfonic acid (1 g) that is a dopant were dispersed in water (100 ml) as a solvent using a polyethylene glycol (2 g) which functions as a surfactant. The polyethylene glycol having a weight average molecular weight of 4,000 was used. The obtained dispersion was stirred under room temperature for 1 hour to be fully dispersed, and then ammonium persulfate (2.4 g) as an oxidant was added to this dispersion. The obtained dispersion was stirred at room temperature for 100 hours to conduct oxidation polymerization. In this case, the solution turned from yellow to dark blue.

The steps of and after the second step were conducted in the same manner as in Example 4. Further, in the same manner as in Example 1 except that the obtained polythiophene aqueous suspension solution was used, an electroconductive polymer formed and electroconductivity and liquid resistance of the electroconductive polymer film was evaluated. The results are shown in Table 1.

Example 7

A polythiophene aqueous suspension solution was produced in the same manner as in Example 1 except that, in the fourth step, pentaerythritol (5 g) was used as water-soluble polyhydric alcohol. Further, in the same manner as in Example 1 except that the obtained polythiophene aqueous suspension solution was used, an electroconductive polymer film was formed and electroconductivity and liquid resistance of the electroconductive polymer film was evaluated. The results are shown in Table 1.

Example 8

A polythiophene aqueous suspension solution was produced in the same manner as in Example 1 except that, in the fourth step, ethylene glycol (5 g) which is bivalent alcohol was used as water-soluble polyhydric alcohol. Further, in the same manner as in Example 1 except that the obtained polythiophene aqueous suspension solution was used, an electroconductive polymer film was formed and electroconductivity and liquid resistance of the electroconductive polymer film was evaluated. The results are shown in Table 1.

Example 9

A polythiophene aqueous suspension solution was produced in the same manner as in Example 1. The obtained polythiophene aqueous suspension solution was dropped onto a glass substrate in an amount of 100 and the solvent was completely volatilized and dried in the thermostatic chamber set at 125° C. to form an electroconductive polymer film. Then, electroconductivity and liquid resistance of the obtained electroconductive polymer film was evaluated in the same manner as in Example 1. The results are shown in Table 1.

Comparative Example 1

A polythiophene aqueous suspension solution was produced in the same method disclosed in Example 1 in JP 07-090060 A. Specifically, a polystyrene sulfonic acid (2 g) having a weight average molecular weight of 4,000, 3,4-ethylenedioxy thiophene (0.5 g), and iron(III) sulfate (0.05 g) were dissolved in water (20 ml), and air was introduced for 24 hours to produce the polythiophene aqueous suspension solution. Further, in the same manner as in Example 1 except that the obtained polythiophene aqueous suspension solution was used, an electroconductive polymer film was formed and electroconductivity and liquid resistance of the electroconductive polymer film was evaluated. The results are shown in Table 1.

Comparative Example 2

A polythiophene aqueous suspension solution was produced in the same manner as in Comparative Example 1 except that a polystyrene sulfonic acid having a weight average molecular weight of 50,000 was used. Further, in the same manner as in Example 1 except that the obtained polythiophene aqueous suspension solution was used, an electroconductive film was formed and electroconductivity and liquid resistance of the electroconductive polymer film was evaluated. The results are shown in Table 1. Also, the crystallinity of the electroconductive polymer film was evaluated by X-ray diffraction method in the same manner as in Example 1. The measurement result of X-ray diffraction is shown in FIG. 1.

Comparative Example 3

A self-emulsion type polyester dispersion (0.3 g) was added to the polythiophene aqueous suspension solution (20 g) obtained in Comparative Example 2, and the self-emulsion type polyester dispersion was dissolved by stirring the mixture under room temperature for 24 hours to produce a polythiophene aqueous suspension solution. Further, in the same manner as in Example 1 except that the obtained polythiophene aqueous suspension solution was used, an electroconductive polymer film was formed and electroconductivity and liquid resistance of the electroconductive polymer film was evaluated. The results are shown in Table 1.

Example 10

Porous aluminum was used as an anode conductor consisting of a valve action metal, and an oxide coating film serving as a dielectric layer was formed on the surface of the aluminum metal by anodic oxidation. The anode part and the cathode part were divided with an insulating resin. Next, the cathode part of the anode conductor with the dielectric layer formed thereon was immersed in and taken out from the polythiophene aqueous suspension solution produced in Example 1, and then the condensation polymerization reaction was conducted in a thermostatic chamber set at 90° C. Further, it was dried and solidified in a thermostatic chamber set at 125° C. to form a solid electrolyte layer. On the solid electrolyte layer, a graphite layer and a silver-containing resin layer were formed in this order to produce a solid electrolytic capacitor.

The ESR (equivalent series resistance) of the obtained solid electrolytic capacitor was measured by using an LCR meter at a frequency of 100 kHz. The ESR value was normalized from the value of the total cathode part to the value of the unit area (1 cm$^2$). The result is shown in Table 2.

Example 11

Porous aluminum was used as the anode conductor consisting of a valve action metal, and an oxide coating film serving as a dielectric layer was formed on the surface of the aluminum metal by anodic oxidation. The anode part and the cathode part were divided with an insulating resin. Next, the cathode part of the anode conductor with the dielectric layer formed thereon was immersed in and taken out from a monomer solution obtained by dissolving pyrrole (10 g) in pure water (200 ml) and immersed in and taken out from an oxidant solution obtained by dissolving p-toluenesulfonic acid (20 g) as a dopant and ammonium persulfate (10 g) as an oxidant in pure water (200 ml), in this order and repeatedly 10 times, to conduct the chemical oxidative polymerization, and thus a first electroconductive polymer compound layer was formed.

The polythiophene aqueous suspension solution produced in Example 1 was dropped onto the first electroconductive polymer compound layer, and then the condensation polymerization reaction was conducted in a thermostatic chamber set at 90° C. Further, it was dried and solidified in a thermostatic chamber set at 125° C. to form a second electroconductive polymer compound layer. On the solid electrolyte layer consisting of the first electroconductive polymer compound layer and the second electroconductive polymer compound layer, a graphite layer and a silver-containing resin layer were formed in this order, and thus a solid electrolytic capacitor was obtained.

The ESR (equivalent series resistance) of the obtained solid electrolytic capacitor was measured in the same manner as in Example 10. The result is shown in Table 2.

Example 12

A solid electrolytic capacitor was produced in the same manner as in Example 10 except that porous tantalum was used as an anode conductor consisting of a valve action metal. The ESR (equivalent series resistance) of the obtained solid electrolytic capacitor was measured in the same manner as in Example 10. The result is shown in Table 2.

Comparative Example 4

A solid electrolytic capacitor was produced in the same manner as in Example 10 except that the polythiophene aqueous suspension solution produced in Comparative Example 2 was used in place of the polythiophene aqueous suspension solution produced in Example 1. The ESR (equivalent series resistance) of the obtained solid electrolytic capacitor was measured in the same manner as in Example 10. The result is shown in Table 2.

Comparative Example 5

A solid electrolytic capacitor was produced in the same manner as in Example 10 except that the polythiophene aqueous suspension solution produced in Comparative Example 3 was used in place of the polythiophene aqueous suspension solution produced in Example 1. The ESR (equivalent series resistance) of the obtained solid electrolytic capacitor was measured in the same manner as in Example 10. The result is shown in Table 2.

TABLE 1

|  | Electroconductivity (S/cm) | Liquid resistance |
| --- | --- | --- |
| Example 1 | 390 | ○ |
| Example 2 | 340 | ○ |
| Example 3 | 405 | ○ |
| Example 4 | 400 | ○ |
| Example 5 | 315 | ○ |
| Example 6 | 320 | ○ |
| Example 7 | 350 | ○ |
| Example 8 | 330 | Δ |
| Example 9 | 365 | Δ |
| Comparative Example 1 | 105 | X |
| Comparative Example 2 | 110 | X |
| Comparative Example 3 | 90 | Δ |

TABLE 2

|  | ESR (mΩ · cm$^2$) |
| --- | --- |
| Example 10 | 1.5 |
| Example 11 | 1.4 |
| Example 12 | 2.0 |
| Comparative Example 4 | 3.2 |
| Comparative Example 5 | 3.4 |

As shown in Table 1, the electroconductive polymer film obtained in Examples 1 to 9 had similar or higher liquid resistance and higher electroconductivity than the electroconductive polymer film obtained in Comparative Examples 1 to 3. From these results, it is clear that an exemplary embodiment of the invention has advantageous effects to realize higher liquid resistance and higher electroconductivity.

Higher liquid resistance effect is realized because the electroconductive polymer suspension solution include a water-soluble polyhydric alcohol, and a water-soluble organic substance having two or more functional groups which can be polycondensed with the water-soluble polyhydric alcohol, and thereby a water-insoluble resin is formed without maldistribution in the electroconductive organic material obtained by drying the electroconductive polymer suspension solution.

The electroconductive polymer film obtained in Examples 1 to 7 was superior to an electroconductive polymer film obtained in Example 8 in liquid resistance. This is because a resin, which has a cross-linked structure formed by condensation polymerization reaction of erythritol or pentaerythritol that is a water-soluble polyhydric alcohol having a valence of 3 or higher with a water-soluble organic substance such as Examples 1 to 7, has lower liquid absorbability and excellent liquid resistance than a resin, which has a linear structure formed by condensation polymerization reaction of ethylene glycol that is a bivalent water-soluble polyhydric alcohol with a water-soluble organic substance such as Example 8.

The electroconductive polymer film obtained in Examples 1 to 7 was superior to an electroconductive polymer film obtained in Example 9 in liquid resistance. This is because, in Examples 1 to 7, before drying the electroconductive polymer suspension solution to obtain the electroconductive organic material, the condensation polymerization reaction of erythritol and ortho-phthalic acid was conducted in a thermostatic chamber set at 90° C., and thereby a water-insoluble resin is fully formed in the electroconductive organic material to improve liquid resistance.

Particularly, by conduction of the first to third steps, (1) the choice range of the dopant is made wider and thereby a dopant which raise crystallinity can be selected, (2) a solvent composition having a high compatibility with the monomer can be selected and thereby a high degree of polymerization is realized, and (3) washing is easily conducted and thereby high purity can be realized. As a result, high electroconductivity can be realized.

Also, in the second step, an unnecessary component can be made high soluble by hot water washing and/or a volatile component can be removed by heat treatment, to realize further high purity. As a result, electroconductivity can further be improved.

Even more particularly, electroconductivity is improved by adding erythritol or pentaerythritol in the fourth step. This is because erythritol or pentaerythritol interacts with an undoped dopant anion (resistance component) served in the third step, which is located in the vicinity of the electroconductive polymer particle in the electroconductive polymer suspension solution, to make the resistance between the electroconductive polymer particles lower and to make the density of the electroconductive polymer higher.

As shown in Table 2, the solid electrolytic capacitor obtained in Examples 10 to 12 had lower resistance (ESR) than the solid electrolytic capacitor obtained in Comparative Examples 4 to 5. This is because the electroconductive organic material used in Examples 10 to 12 has a high electroconductivity to make the resistance of solid electrolyte low and to make resistance (ESR) low.

Example 13

Erythritol (5 g), pentaerythritol (1.25 g), ortho-phthalic acid (0.3 g), a polydiethylene glycol phthalate diol (1.25 g) were added to poly(3,4-ethylenedioxy thiophene)-polystyrene sulfonic acid solution (made by H. C. Starck) (50 g). After that, it was stirred at room temperature for 24 hours to completely dissolving the compounds to the mixture solution.

Then, the obtained polythiophene suspension solution was dropped onto a glass substrate in an amount of 15 μl, and the condensation polymerization reaction was conducted in a thermostatic chamber set at 90° C. After that the solvent was completely volatilized and dried in the thermostatic chamber set at 125° C. to form an electroconductive polymer film. Adhesive property and liquid resistance of the obtained electroconductive polymer film were evaluated. Evaluation results are shown in Table 3.

Note that, the adhesive property was evaluated by cross-cut method. Specifically, some cut lines were put in the electroconductive polymer film in the shape of grid with cutter blade, and a Teflon (registered trade mark) tape was attached and peeled for evaluation. The presence or absence of peeling was determined by the appearance of the electroconductive polymer film.

Also, the liquid resistance was evaluated by water immersing method. Specifically, the obtained electroconductive polymer film was immersed in water for 10 minutes and by observing the change of the electroconductive polymer film. Note that, "○" means a result that there is no observed change in the electroconductive polymer film, and "X" means a result that the electroconductive polymer is fully swelled.

Example 14

A polythiophene suspension solution was produced in the same manner as in Example 13 except that pentaerythritol was not added, and an electroconductive polymer film was formed and evaluated. The evaluation results are shown in Table 3.

Example 15

A polythiophene suspension solution was produced in the same manner as in Example 13 except that a polydiethylene glycol phthalate diol was not added, and an electroconductve polymer film was formed and evaluated. The evaluation results are shown in Table 3.

Comparative Example 6

A polythiophene suspension solution was produced in the same manner as in Example 13 except that pentaerythritol, ortho-phthalic acid, and a polydiethylene glycol phthalate diol were not added, and an electroconductive polymer film was formed and evaluated. The evaluation results are shown in Table 3.

Comparative Example 7

A polythiophene suspension solution was produced in the same manner as in Example 13 except that erythritol, pentaerythritol, and ortho-phthalic acid were not added, and an electroconductive polymer film was formed and evaluated. The evaluation results are shown in Table 3.

Comparative Example 8

A polythiophene suspension solution was produced in the same manner as in Example 13 except that additives were not added to poly(3,4-ethylenedioxy thiophene)-polystyrene sulfonic acid solution, and an electroconductive polymer was formed and evaluated. The evaluation results are shown in Table 3.

Example 16

A solid electrolytic capacitor was produced by using the polythiophene suspension solution obtained in Example 13. A porous body aluminum foil of 3×4 mm, which was subjected to surface area enlargement treatment by etching, was used as an anode conductor. The anode conductor was immersed in a monomer solution containing 3,4-ethylenedioxy thiophene as a monomer and in a solution containing iron(III) p-toluenesulfonate as a dopant and ammonium persulfate as an oxidant, repeatedly several times. By this chemical polymerization method, a first electroconductive polymer compound layer comprising poly(3,4-ethylenedioxy thiophene) was formed inside the pore in the porous body. Next, the polythiophene suspension solution produced in Example 13 was dropped onto the first electroconductive polymer compound layer. After that, the condensation polymerization reaction was conducted in a thermostatic chamber set at 90° C., and it was further dried and solidified in a thermostatic chamber set at 125° C. to form a second electroconductive polymer compound layer. On the second electroconductive polymer compound layer, a graphite layer and a silver electroconductive resin layer were formed in this order, and thus a solid electrolytic capacitor was obtained.

The ESR of the obtained solid electrolytic capacitor was measured by using an LCR meter at a frequency of 100 kHz. The ESR value was normalized from the value of the total cathode part to the value of the unit area (1 cm$^2$). The result is shown in Table 4.

Example 17

A solid electrolytic capacitor was produced in the same manner as in Example 16 except that the polythiophene suspension solution obtained in Example 14 was used, and the ESR thereof was measured. The result is shown in Table 4.

Example 18

A solid electrolytic capacitor was produced in the same manner as in Example 16 except that the polythiophene suspension solution obtained in Example 15 was used, and the ESR thereof was measured. The result is shown in Table 4.

Comparative Example 9

A solid electrolytic capacitor was produced in the same manner as in Example 16 except that the polythiophene suspension solution obtained in Comparative Example 6 was used, and the ESR thereof was measured. The result is shown in Table 4.

Comparative Example 10

A solid electrolytic capacitor was produced in the same manner as in Example 16 except that the polythiophene suspension solution obtained in Comparative Example 7 was used, and the ESR thereof was measured. The result is shown in Table 4.

Comparative Example 11

A solid electrolytic capacitor was produced in the same manner as in Example 16 except that the polythiophene suspension solution obtained in Comparative Example 8 was used, and the ESR thereof was measured. The result is shown in Table 4.

TABLE 3

|  | Adhesive property | Liquid resistance |
| --- | --- | --- |
| Example 13 | no peeling | ◯ |
| Example 14 | no peeling | ◯ |
| Example 15 | no peeling | ◯ |
| Comparative Example 6 | Peeling | X |
| Comparative Example 7 | partial peeling | ◯ |
| Comparative Example 8 | Peeling | X |

TABLE 4

|  | ESR (mΩ · cm$^2$) |
| --- | --- |
| Example 16 | 3.00 |
| Example 17 | 3.50 |
| Example 18 | 4.00 |
| Comparative Example 9 | 8.00 |
| Comparative Example 10 | 6.00 |
| Comparative Example 11 | 10.00 |

As shown in Table 3, adhesive properties and liquid resistances of Examples 13 to 15 were similar to or higher than those of Comparative Examples 6 to 8, and it is clear that an exemplary embodiment of the invention has advantageous effects to improve adhesive property and liquid resistance. This is because a resin formed by condensation polymerization reaction of erythritol or pentaerythritol that is a water-soluble polyhydric alcohol having a valence of 3 or higher with a water-soluble organic substance having two or more functional groups which can be polycondensed with the water-soluble polyhydric alcohol has a cross-linked structure and has lower liquid absorbability and excellent liquid resistance. Adhesive property and liquid resistance of Comparative Example 7 were superior to those of Comparative Examples 6 and 8. This is because it contains an organic polymer resin to improve adhesion property to the substrate.

Also, from Table 4, the solid electrolytic capacitor which has a solid electrolyte made by using an electroconductive polymer suspension solution of an exemplary embodiment of the invention has low resistance due to high electroconductivity of the electroconductive polymer. Particularly, Examples 16 and 17 showed lower ESR than the other Examples and Comparative Examples. The resin having many mixed branches of cross-linked structure and linear structure can be obtained because it contains a water-insoluble resin obtained by condensation polymerization reaction in the dry process of a water-soluble polyhydric alcohol completely dissolved in a solvent and a water-soluble organic substance having two or more functional groups which can be polycondensed with the water-soluble polyhydric alcohol and also contains an organic polymer resin dissolved or dispersed in the solvent. Therefore, the electroconductive organic material which has a further improved adhesion property to the substrate and liquid resistance was obtained.

The present invention was described with reference to an exemplary embodiment of the invention and the Examples as mentioned above, but the present invention is not limited to an exemplary embodiment of the invention and the Examples. The constituents and details of the present invention can be variously changed within a scope of the present invention by a person ordinarily skilled in the art.

What is claimed is:

1. An electroconductive polymer suspension solution comprising:
    an electroconductive polymer,
    at least one kind of a water-soluble polyhydric alcohol,
    at least one kind of a water-soluble organic substance having two or more functional groups which can be polycondensed with the water-soluble polyhydric alcohol, and
    at least one kind of an organic polymer resin, wherein the organic polymer resin contains a phthalate ester.

2. The electroconductive polymer suspension solution according to claim 1, wherein the electroconductive polymer is constructed from 3,4-ethylenedioxy thiophene and a derivative thereof and wherein the electroconductive polymer suspension solution further comprises a polyacid.

3. The electroconductive polymer suspension solution according to claim 2, comprising a polystyrene sulfonic acid as the polyacid.

4. The electroconductive polymer suspension solution according to claim 3, wherein the polystyrene sulfonic acid has a weight average molecular weight of 2,000 to 500,000.

5. The electroconductive polymer suspension solution according claim 1, wherein the water-soluble polyhydric alcohol has a valence of 3 or higher.

6. The electroconductive polymer suspension solution according to claim 5, wherein the water-soluble polyhydric alcohol is at least one kind selected from erythritol and pentaerythritol.

7. The electroconductive polymer suspension solution according to claim 1, wherein the functional group of the water-soluble organic substance, which can be polycondensed with the water-soluble polyhydric alcohol, is a carboxyl group.

8. The electroconductive polymer suspension solution according to claim 7, wherein the water-soluble organic substance is ortho-phthalic acid.

9. The electroconductive polymer suspension solution according to claim 1, wherein the organic polymer resin is a compound represented by following formula (3):

(3)

wherein n is 2 or more in the formula(3).

10. A method for producing an electroconductive polymer suspension solution comprising:
  a first step of obtaining a mixture containing an electroconductive polymer by chemical oxidative polymerization of a monomer giving the electroconductive polymer by using an oxidant in a solvent containing an organic acid or a salt thereof as a dopant,
  a second step of collecting the electroconductive polymer from the mixture,
  a third step of contacting the electroconductive polymer with an oxidant in an aqueous solvent containing a polyacid, and
  a fourth step of mixing at least one kind of a water-soluble polyhydric alcohol and at least one kind of a water-soluble organic substance having two or more functional groups which can be polycondensed with the water-soluble polyhydric alcohol.

11. The method for producing an electroconductive polymer suspension solution according to claim 10, wherein the monomer giving the electroconductive polymer is selected from pyrrole, thiophene, aniline and derivatives thereof.

12. The method for producing an electroconductive polymer suspension solution according to claim 10, wherein the dopant is at least one kind selected from benzenesulfonic acid, naphthalenesulfonic acid, camphorsulfonic acid, and derivatives thereof, and salts of these.

13. The method for producing an electroconductive polymer suspension solution according to claim 10, wherein the first step is conducted in the presence of at least one selected from the group consisting of amonic surfactants, cationic surfactants, and amphoteric surfactants.

14. The method for producing an electroconductive polymer suspension solution according to claim 10, wherein, in the second step, the electroconductive polymer is washed with a solvent which can dissolve the monomer and/or the oxidant.

15. An electroconductive organic material comprising:
  an electroconductive polymer,
  a resin obtained by a condensation polymerization of a monomer consisting of at least one kind of a water-soluble polyhydric alcohol and at least one kind of a water-solubles organic substance having two or more functional groups which can be polycondensed with the water-soluble polyhydric alcohol, and
  at least one kind of an organic polymer resin,
  wherein the water-soluble polyhydric alcohol is at least one selected from the group consisting of ethylene glycol, butylene glycol, propylene glycol, 3-methyl-1,3-butanediol, hexylene glycol, diethylene glycol, dipropylene glycol, glycerin diglycerin, inositol, xylose, glucose, mannitol, trehalose, erythritol, xylitol, sorbitol, pentaerythriol, polyethylene glocols, polyproplene glycols, and polyvinyl alcohols, and
  wherein the water-soluble organic substance having two or more functional groups is at least one selected from the group consisting of sorbitol polyglycidyl ethers, polyglycerol polyglysidyl ethers, diglycerol polyglyeidyl ethers, glycerol polyglycidyl ethers, triethylolpropane polyglycidyl ethers, polypropylene glycol diglycidyl ethers, oxalic acid, acetylenedicarboxylic acid, malonic acid, suceinic acid, fumaric acid, malie acid, oxalacetic acid, glutaric acid, oxoglutarie acid, adipie acid, oxalosuccinie acid, ortho-pthalic acid, hemimellitic acid, trimesie acid, mellopanic acid, benzene pentacarboxylic acid, and mellitic acid.

16. An electrolytic capacitor comprising an electrolyte layer which contains an electroconductive organic material comprising:
  an electroconductive polymer,
  a resin abtained by a condensation polymerization of at least one kind of a water-soluble polyhydric alcohol and at least one kind of a water-soluble organic substance having two or more functional groups which can be polycondensed with the water-soluble polyhydric alcohol, and at least one kind of an organic polymer resin.

17. A method for producing an electrolytic capacitor, comprising:
  forming a dielectric layer on a surface of an anode conductor consisting of a valve action metal,
  applying or impregnating an electroconductive polymer suspension solution comprising an electroconductive polymer, at lease one kind of a water-soluble polyhydric alcohol, at least one kind of water-soluble organic substance having two or more functional groups which can be polycondensed with the water-soluble polyhydric alcohol, and at least one kind of an organic polymer resin on the dielectric layer, and
  heating the electroconductive polymer suspension to conduct condensation polymerization of the water-soluble polyhydric alcohol and the water-soluble organic substance, and to dry the electroconductive polymer suspension solution to form an electrolyte layer.

* * * * *